(12) United States Patent
Merienne

(10) Patent No.: US 10,520,080 B2
(45) Date of Patent: Dec. 31, 2019

(54) METHOD FOR CONTROLLING A GEAR SHIFT ACTUATOR AND CORRESPONDING SHIFT ACTUATOR

(71) Applicants: RENAULT s.a.s., Boulogne-Billancourt (FR); NISSAN MOTOR Co. Ltd.

(72) Inventor: Ludovic Merienne, Gif sur Yvette (FR)

(73) Assignees: RENAULT s.a.s., Boulogne-Billancourt (FR); NISSAN MOTOR Co. Ltd., Yokohama-Shi (JP)

( * ) Notice: Subject to any disclaimer, the term of this patent is extended or adjusted under 35 U.S.C. 154(b) by 425 days.

(21) Appl. No.: 15/302,394

(22) PCT Filed: Mar. 12, 2015

(86) PCT No.: PCT/FR2015/050617
§ 371 (c)(1),
(2) Date: Nov. 10, 2016

(87) PCT Pub. No.: WO2015/155429
PCT Pub. Date: Oct. 15, 2015

(65) Prior Publication Data
US 2017/0051826 A1    Feb. 23, 2017

(30) Foreign Application Priority Data
Apr. 7, 2014  (FR) ...................... 14 53041

(51) Int. Cl.
*F16H 61/00*   (2006.01)
*F16H 61/04*   (2006.01)
(Continued)

(52) U.S. Cl.
CPC ......... *F16H 61/0403* (2013.01); *F16H 61/32* (2013.01); *F16H 63/304* (2013.01); *F16H 2063/3089* (2013.01)

(58) Field of Classification Search
CPC .... F16H 61/0403; F16H 63/304; F16H 61/32; F16H 2061/0422; F16H 2306/50;
(Continued)

(56) References Cited

U.S. PATENT DOCUMENTS 7,197,955 B2 * 4/2007 Sharma ................ F16H 63/304
310/75 R
7,350,432 B2 * 4/2008 Somschor ............... F16H 61/32
74/335
(Continued)

FOREIGN PATENT DOCUMENTS

DE    199 17 215 A1   10/2000
EP    2 385 270 A1    11/2011
(Continued)

OTHER PUBLICATIONS

International Search Report dated Jun. 29, 2015 in PCT/FR2015/050617 filed Mar. 12, 2015.
(Continued)

*Primary Examiner* — Victor L MacArthur
(74) *Attorney, Agent, or Firm* — Oblon, McClelland, Maier & Neustadt, L.L.P.

(57) ABSTRACT

A method controls a shift actuator with a sliding gear for a gearbox. The gearbox includes a control element for controlling a shift fork responsible for disengaging and engaging pinions on a shaft of the gearbox that receives torque from a traction machine powered by the on-board electrical system of the vehicle. The control element is positioned upstream of a mechanical spring-assist system and regulated in position by a DC actuating motor. The method includes temporarily raising a supply voltage applied to the actuating motor above a base voltage of an on-board electrical system during the disengaging and engaging the pinions.

8 Claims, 4 Drawing Sheets

(51) Int. Cl.
*F16H 61/32* (2006.01)
*F16H 63/30* (2006.01)

(58) Field of Classification Search
CPC ......... F16H 2061/0474; F16H 2306/46; F16H 2063/3089; B60Y 2200/90
See application file for complete search history.

(56) References Cited

U.S. PATENT DOCUMENTS

| 8,156,839 B2* | 4/2012 | Meaney | F16H 61/32 |
| | | | 74/335 |
| 2004/0254040 A1* | 12/2004 | Somschor | F16H 61/32 |
| | | | 475/149 |
| 2011/0265601 A1 | 11/2011 | Pastorello et al. | |

FOREIGN PATENT DOCUMENTS

| FR | 2 901 334 A1 | 11/2007 |
| FR | 2 988 800 A1 | 10/2013 |

OTHER PUBLICATIONS

French Search dated Dec. 1, 2014 in French Application 1453041, filed Apr. 7, 2014.

* cited by examiner

METHOD FOR CONTROLLING A GEAR SHIFT ACTUATOR AND CORRESPONDING SHIFT ACTUATOR

BACKGROUND

The present invention relates to gear shifting control in a parallel shaft gearbox, provided with an actuator.

It relates to a method for controlling a shift actuator with a sliding gear comprising a control element for controlling a shift fork responsible for disengaging and engaging pinions on a shaft of the gearbox, that receives the torque from a traction machine powered by the on-board electrical system of the vehicle. This control element is placed upstream of a mechanical spring-assist system. It is regulated in position by a DC actuating motor.

The invention also relates to a shift actuator comprising a control element for controlling a shift fork ensuring the disengaging and engaging of pinions on a shaft of the gearbox. This control element is regulated in position by a DC actuating motor supplied by an on-board electrical system of the vehicle equipped with a voltage modulation element. In this actuator, the control element is placed upstream of a mechanical spring-assist system, facilitating the engagement of the teeth of the sliding gear between those of the pinion.

The invention finds a preferred, but non-limiting, application on "robotic" type gearboxes, which operate as a manual gearbox with automatic shifting, without pinion synchronization mechanisms.

In internal gear shift control systems without synchronization mechanisms, sliding gears with flat teeth or "claws" are used, which abut against the teeth of the gear pinion to be engaged, before turning slightly in relation to the pinion so as to be able to engage between its teeth.

In order to attain the required levels of shifting comfort, shift-assist devices can be used, which implement a resistance spring, capable of storing energy when it compresses during the synchronization phase and releasing the energy at the conclusion of this phase, to facilitate the engagement of the pinion.

Publication FR 2 988 800 discloses a known system for actuating a sliding claw gear, comprising a rigid fork displacement fixture equipped with two arms engaged about a control shaft, so as to allow its own axial displacement along this shaft, under the control of an external element. The system further comprises a resistance spring, wrapped about the fork shaft between the two arms of the fixture and two retaining collars abutting between the ends of the spring and the arms of the fixture, so as to be able to slide with limited movement along the shaft. The spring stores the energy supplied by the actuator, when the teeth of the sliding gear and the pinion abut. The spring releases the energy when engagement is possible, by accelerating the fork. The acceleration obtained depends on the compression of the spring, and therefore on the torque transmitted by the electric motor during the phase when the teeth abut.

During a gear change, it is important to minimize the time taken by all necessary operations required for smooth shifting.

BRIEF SUMMARY

The present invention aims to optimize this process by acting on the regulation control parameters.

To this end, it proposes that the voltage applied to the actuating motor is temporarily raised during the pinion disengaging and engaging operations.

More specifically, the voltage setpoint of the actuating motor is temporarily modulated to a value higher than the normal supply voltage.

According to a particular embodiment of the actuator, the voltage converter of the on-board electrical system temporarily modulates the voltage of the actuating motor to a value greater than the normal supply voltage of the on-board electrical system, during the pinion disengaging and engaging operations.

BRIEF DESCRIPTION OF THE DRAWINGS

The present invention will be better understood upon reading the following description of a non-limiting embodiment of the invention, made with reference to the accompanying drawings, wherein.

DETAILED DESCRIPTION

Figure 1:
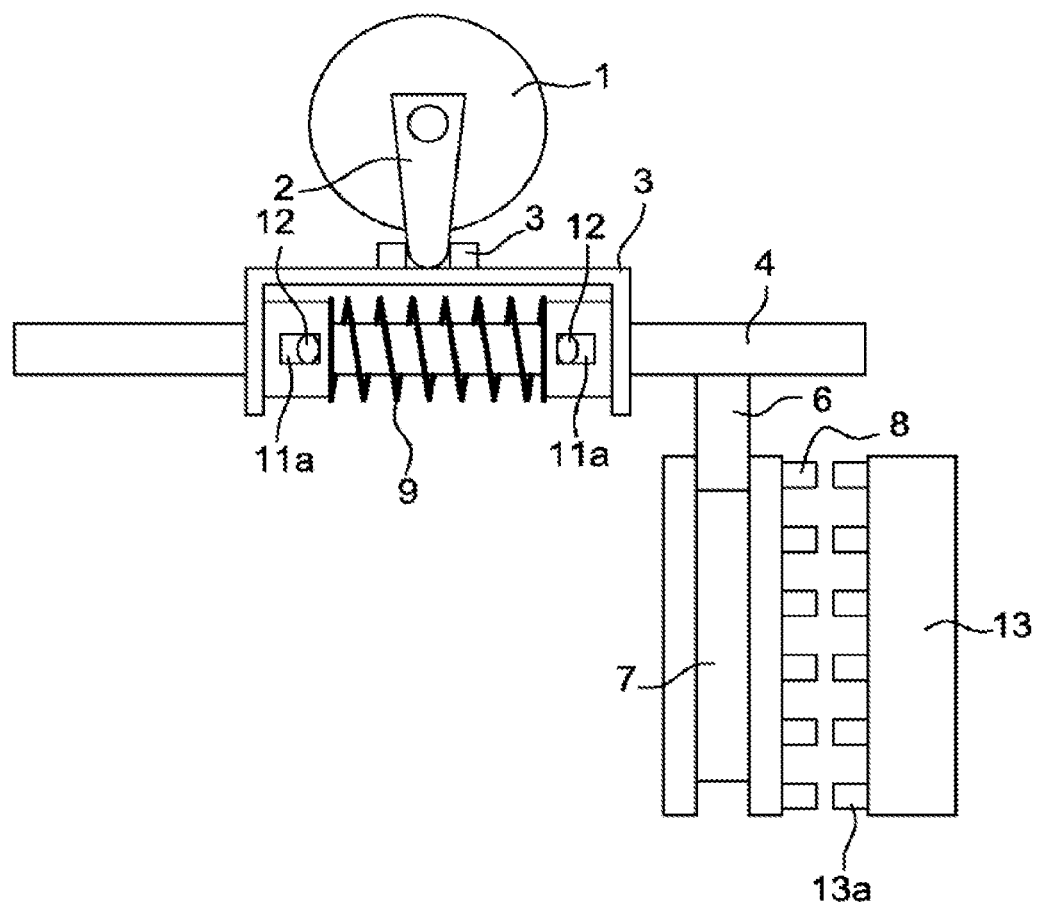
FIG. 1 presents the mechanical principle of the actuator.

The electric gear shift actuator, illustrated in FIG. 1 in a non-limiting manner, is under the control of an electric motor 1, rotatably connected to a control element, such as a gear shift pin (2). The pin 2 is engaged in the groove 3 of a rigid fixture 3, such as described in publication FR 2 988 800, which is provided with two arms 3a engaged about the control shaft 4 of a control fork 6 for controlling a sliding gear 7 with flat teeth or "claws" 8. The sliding gear is displaced under the control of the motor 1, which receives the position information from a position sensor and a resistance spring 9 wound about the shaft 4 between the two arms 3a of the fixture. Two collars limit the maximum compression of the spring 9 and the movement of fixture on the shaft, owing to the presence of oblong slots ha in which a pin 12, secured to the shaft 4, moves. In summary, this actuator comprises a control element for controlling a shift fork ensuring the disengagement and engagement of pinions on a shaft of the gearbox. This control element is regulated in position by a DC actuating motor powered by the on-board electrical system of the vehicle and placed upstream of a mechanical spring-assist system facilitating the engagement of the teeth of the sliding gear between those of the pinion. It operates as follows.

When a gear is engaged, the assembly consisting of the fixture, the spring, the collars, the shaft and the fork moves as one until the fork meets resistance related to the placement of the teeth 8 of the sliding gear against the teeth 13a of the pinion 13. The spring 9 is compressed between the collars 11 by the continued movement of the fixture 3 in a spring loading phase, between the placement of the sliding gear against the pinion and its engagement thereon, i.e. the engagement of its teeth between those of the pinion. The spring then relaxes, releasing the energy it has accumulated, to assist the engagement of the sliding gear on the pinion.

Figure 2:
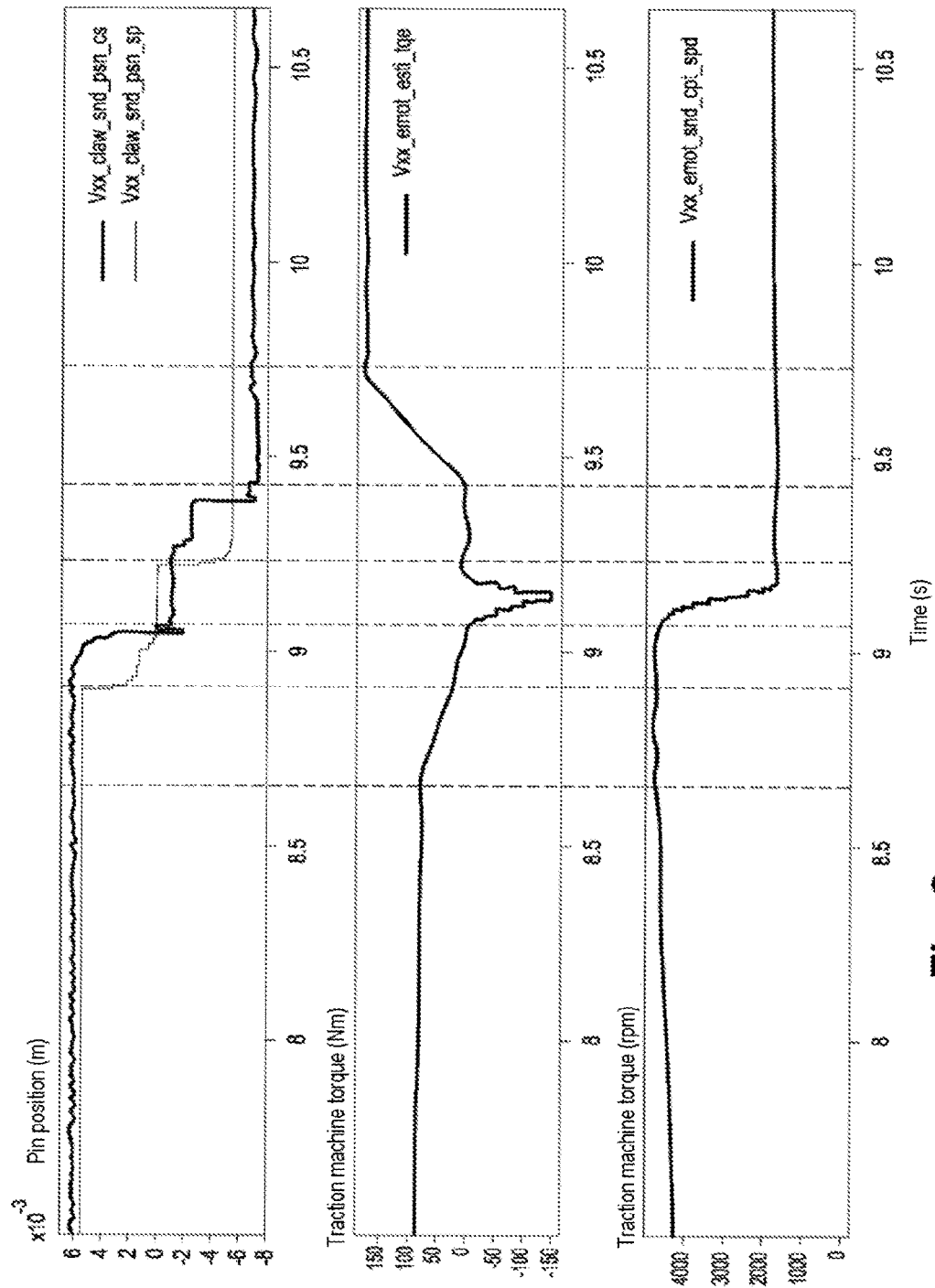
FIG. 2 shows the steps of a gear change

The control takes place by means of the voltage applied to the electric motor of the actuator 1, which is preferably a DC machine. It is the position of the fork that determines the gear shifting, but this measure is not accessible to the regulation. The control is regulated by the position of the pin 2 which is upstream of the assistance means in the kinematic control chain. The variables measured and used in the regulation are the position of the pin 2 and the supply current of the motor. The three curves in FIG. 2 show the change in the position of the pin (in millimeters), the traction torque (in newton meters), and the speed of the traction machine in revolutions per minutes (rpm), respectively. In reference to FIG. 2, it can be seen that the control of the actuator includes the following steps during a gear change operation:

a) cancellation of the torque delivered by the traction machine (electric or Internal combustion) of the vehicle, driving the shaft, b) disengagement of the idler of the first gear (first gear ratio) by regulating the position of the pin 2: the drive motor then freewheels (or is in neutral position) (step 2), c) synchronization of the shaft with the idler of the second gear (final gear ratio) by the traction machine, in order to be able to engage the desired gear (step 3), d) engagement of the second pinion by regulating the position of the pin 2 (step 4).

e) reapplication of torque on the traction machine (step 5).

FIG. 2 indicates the duration of each of these steps. On its second curve, it can be seen that the cancellation of the torque provided by the electric traction machine (step 1) takes approximately 400 ms. Disengagement (step 2) takes approximately 200 ms (second curve). The synchronization phase (step 3) then takes approximately 150 ms. After synchronization, engagement (step 4) again takes 200 ms.

Figure 3:
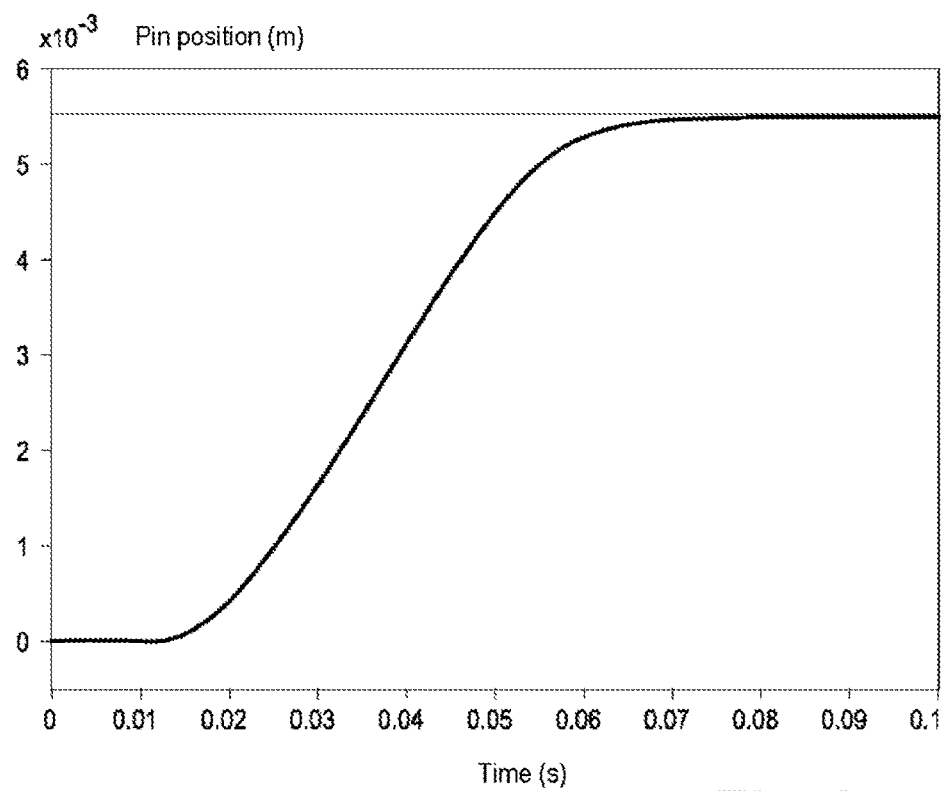
FIG. 3 illustrates the regulation with a voltage of the conventional on-board electrical system at 12 V, FIG. 4 highlights the performance improvement achieved by modifying this voltage.
Figure 4:
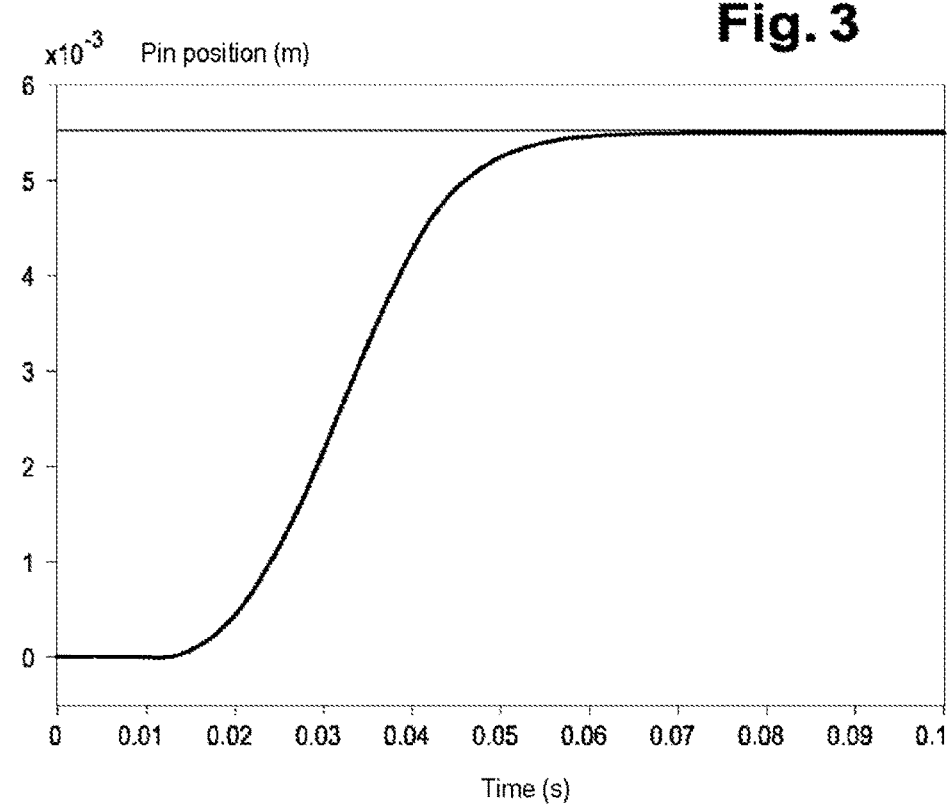

FIG. 3 illustrates the performance of the pin position regulation, with a voltage of the conventional on-board electrical system at 12 V. As shown in FIG. 4, if the voltage of the on-board electrical system is increased to 16 V, the performance of the regulation can be improved. The gain in the engagement is of the order of 10 ms. Given that the regulation intervenes on engagement and disengagement of the pinion, the time savings on the entire gear change operation is double, i.e. approximately 20 ms on a gear shifting operation.

The gearbox actuator is normally powered by the 12V battery of the vehicle. The DC motors making it possible to move the actuator pin are dimensioned to operate in this order of voltage magnitude. Furthermore, the performance of the pin position regulation depends on the power of the motors mounted in the gearbox. This power is limited by the voltage of the on-board electrical system. Now, electric or hybrid vehicles typically have a 12V on-board battery (LV battery) and a battery of stronger voltage (HV battery), e.g. 400V, primarily intended to power a traction machine of the vehicle. A DC/DC (Direct Current/Direct Current) voltage converter then plays the role of the generator of a conventional internal combustion vehicle. The DC/DC draws energy from the HV battery of the vehicle, and supplies the on-hoard electrical system to maintain the charge status of the 12V battery.

Using the DC/DC, the voltage of the on-board electrical system can be modulated, notably to recharge the 12V battery. The converter can thus be used to modulate the voltage of the actuating motor of the control element 2, with the aim of improving regulation performance. This objective is achieved by minimizing the total duration of the regulation so as to make the gear change virtually imperceptible. The solution consists in temporarily increasing the voltage of the on-board electrical system in anticipation of using the shift actuator. The DC/DC temporarily modulates the voltage applied to the actuating motor 1, at a value greater than the normal supply voltage of the on-hoard electrical system, during the pinion disengaging and engaging operations.

The increase in the supply voltage of the actuating motor 1 is activated via the DC/DC, during the torque cancellation of the traction machine of the vehicle which occurs at the start of each gear shift operation. This cancellation necessarily takes a certain amount of time. For driveability requirements, the torque cannot be canceled suddenly, so it generally remains greater than about a hundred ms. This amount of time is sufficient to allow the DC/DC to react to its voltage setpoint and to Increase the voltage of the on-board electrical system. The supply voltage of the on-board electrical system is raised temporarily. This voltage increase is activated during the cancellation of the traction torque before a pinion is disengaged. The current converter is then restored to its basic setpoint, after engaging a new pinion.

Figure 5:
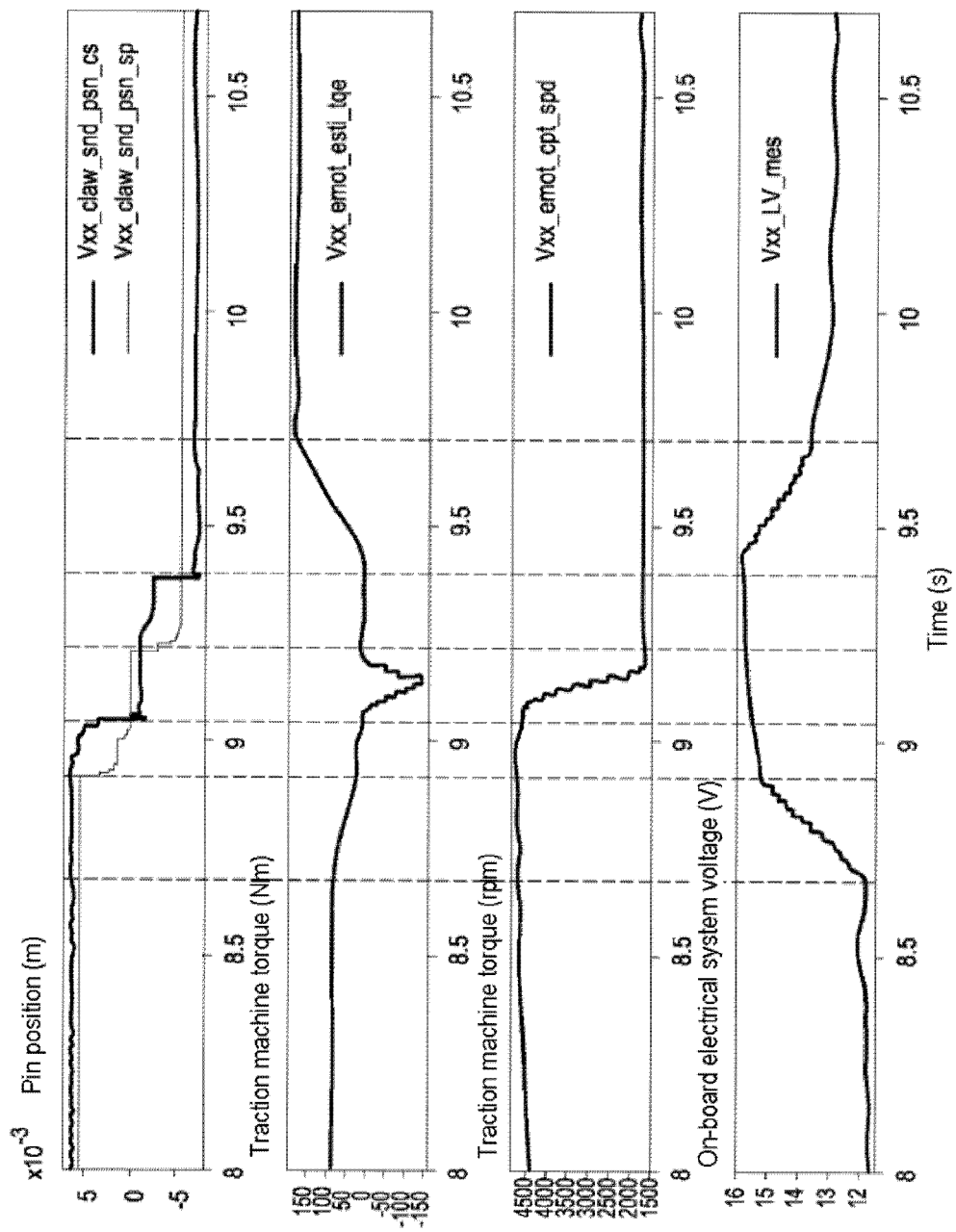
FIG. 5 shows a new sequence with modification of the voltage of the actuator drive motor.

The new gear change sequence, illustrated in FIG. 5, becomes:

a) temporary increase of the voltage setpoint applied by the on-board electrical system to the actuating motor of the control element 6 during the cancellation of the torque of the traction machine of the vehicle, b) disengagement of the pinion transmitting the torque on a first gear, c) synchronization of the gearbox shaft and the pinion used on a second gear, d) engagement of the second pinion, e) return to the basic setpoint on the on-board electrical system during the reapplication of torque of the traction machine.

In conclusion, the invention reduces the gear change time without negatively impacting driveability (unlike a reduction of the torque cancellation and reapplication times). It takes advantage of the features of systems already present on the vehicle, and requires only software adaptation for modulating the DC/DC voltage setpoint.

The invention claimed is:

1. A method for controlling a shift actuator with a sliding gear for a gearbox of a vehicle, the gearbox comprising a control element for controlling a shift fork responsible for disengaging and engaging pinions on a shaft of the gearbox that receives torque from a traction machine powered by an on-board electrical system of the vehicle, the on-board electrical system including a low voltage battery, a high voltage battery, and a DC/DC converter, the control element being positioned upstream of a mechanical spring-assist system and regulated in position by a DC actuating motor, the method comprising:

provided a supply voltage to the actuating motor that is equal to a base voltage of the lower voltage battery; and temporarily raising the supply voltage applied to the actuating motor above the base voltage during the disengaging and engaging the pinions.

2. The method for controlling a shift actuator as claimed in claim 1, wherein the supply voltage of the actuating motor is increased during a cancellation the torque of the traction machine of the vehicle.

3. The method for controlling a shift actuator as claimed in claim 2, wherein the increase in the supply voltage of the actuating motor is activated via the DC/DC converter (DC/DC).

4. The method for controlling a shift actuator as claimed in claim 2, wherein the supply voltage of the actuating motor is increased at a level of a battery voltage supplying the traction machine of the vehicle.

5. The method for controlling a shift actuator as claimed in claim 2, wherein the temporarily raising includes:
   temporarily increasing a voltage setpoint applied by the on-board electrical system to the actuating motor during the cancellation of the torque of the traction machine of the vehicle;
   disengaging the pinion transmitting the torque on a first gear;
   synchronizing the gearbox shaft and the pinion used on a second gear;
   engaging the second pinion;
   returning the voltage setpoint to a basic setpoint on the on-board electrical system during reapplication of the torque of the traction machine.

6. The method for controlling a shift actuator as claimed in claim 1, wherein the base voltage is 12V.

7. The method for controlling a shift actuator as claimed in claim 6, wherein the supply voltage is raised to 16V during the temporarily raising.

8. The method for controlling a shift actuator as claimed in claim 1, wherein the high voltage battery is configured to power the traction machine of the vehicle.

\* \* \* \* \*

UNITED STATES PATENT AND TRADEMARK OFFICE
CERTIFICATE OF CORRECTION

PATENT NO. : 10,520,080 B2
APPLICATION NO. : 15/302394
DATED : December 31, 2019
INVENTOR(S) : Ludovic Merienne It is certified that error appears in the above-identified patent and that said Letters Patent is hereby corrected as shown below:

On the Title Page

Item (71), the second Applicant's city has been omitted. Item (71) should read:
-- Applicants: RENAULT s.a.s., Boulogne-Billancourt (FR); NISSAN MOTOR Co. Ltd., Yokohama-Shi (JP) --

Signed and Sealed this
Twenty-fifth Day of February, 2020

Andrei Iancu
*Director of the United States Patent and Trademark Office*